United States Patent
Hayashi et al.

(10) Patent No.: US 7,205,017 B2
(45) Date of Patent: Apr. 17, 2007

(54) APPARATUS AND METHOD FOR BEATING AND ROLLING A FOOD DOUGH BELT

(75) Inventors: Torahiko Hayashi, Utsunomiya (JP); Michio Morikawa, Utsunomiya (JP)

(73) Assignee: Rheon Automatic Machinery Co., Ltd. (JP)

( * ) Notice: Subject to any disclaimer, the term of this patent is extended or adjusted under 35 U.S.C. 154(b) by 315 days.

(21) Appl. No.: 10/654,553

(22) Filed: Sep. 3, 2003

(65) Prior Publication Data

US 2004/0065210 A1    Apr. 8, 2004

(30) Foreign Application Priority Data

Sep. 3, 2002   (JP)   .............. 2002-258135
Sep. 3, 2002   (JP)   .............. 2002-258136

(51) Int. Cl.
*A21C 3/02*   (2006.01)

(52) U.S. Cl. .............. 426/502; 426/504; 426/517; 426/560; 425/367; 425/373

(58) Field of Classification Search ............... 426/451, 426/502, 391, 496, 498, 504, 519, 549, 560, 426/512, 517; 425/363, 365, 373, 145, 471, 425/367

See application file for complete search history.

(56) References Cited

U.S. PATENT DOCUMENTS

| | | | |
|---|---|---|---|
| 4,192,636 A * | 3/1980 | Hayashi et al. ............... 425/96 |
| 4,276,317 A * | 6/1981 | Hayashi ..................... 426/501 |
| 4,631,017 A * | 12/1986 | Hayashi ..................... 425/335 |
| 4,880,375 A | 11/1989 | Hayashi |
| 5,079,014 A * | 1/1992 | Morikawa et al. ........... 426/231 |
| 5,118,274 A * | 6/1992 | Morikawa et al. ........... 425/140 |
| 5,154,941 A * | 10/1992 | Hayashi ..................... 426/496 |
| 5,266,341 A * | 11/1993 | Morikawa et al. ........... 426/231 |
| 5,310,569 A * | 5/1994 | Muller ....................... 426/504 |
| 5,783,218 A * | 7/1998 | Morikawa .................... 425/101 |
| 5,804,225 A * | 9/1998 | Hayashi ..................... 425/363 |
| 5,843,510 A * | 12/1998 | Hayashi ..................... 426/502 |
| 6,082,988 A | 7/2000 | Muller et al. |
| 6,171,629 B1 * | 1/2001 | Morikawa .................... 426/502 |
| 6,257,861 B1 * | 7/2001 | Morikawa .................... 425/363 |
| 6,322,345 B1 * | 11/2001 | Zaltron ....................... 425/363 |

FOREIGN PATENT DOCUMENTS

| | | |
|---|---|---|
| DE | 29502209.4 | 5/1995 |
| EP | 0128015 A2 | 12/1984 |
| EP | 0309005 A1 | 3/1989 |
| EP | 1203533 A1 | 5/2002 |
| JP | 44-6607 | 3/1944 |
| JP | 60-52769 | 11/1985 |
| JP | 63-54333 | 10/1988 |
| JP | 2917002 | 4/1999 |
| JP | 2003-061561 | 4/2003 |
| WO | WO 00/11958 | 3/2000 |

* cited by examiner

*Primary Examiner*—Drew Becker
(74) *Attorney, Agent, or Firm*—Jackson Walker, LLP (57) ABSTRACT

A plurality of rolling rollers move sequentially upstream from downstream or downstream from upstream along the food dough belt, while each rolling roller rotates on its own axis. The moving direction of the rolling roller is changed according to technical requirements. The number of beats is regulated by changing the moving speed V1 of the rolling roller. Further, the peripheral speed of the rolling roller is made to be equal to or almost equal to the surface speed of the food dough belt by changing the rotating speed V2 of the rolling roller.

7 Claims, 10 Drawing Sheets

APPARATUS AND METHOD FOR BEATING AND ROLLING A FOOD DOUGH BELT

FIELD OF THE INVENTION

This invention relates to a treatment prior to molding food dough, such as bread dough, etc., in various forms of breads, and, particularly, to an apparatus and a method for beating and rolling a food dough belt, as for example, a fermented dough belt, to make the internal phase or internal structure of the food dough uniform, and to supply the thinly rolled food-dough belt to the next processes.

BACKGROUND OF THE INVENTION

When viscoelastic food dough such as bread dough is mechanically formed, elasticity of the food dough is not useful. Conventionally, in order to mechanically form viscoelastic food dough, it is necessary to generate a stress beyond the yield point of the elasticity of the food dough. But, in such a mechanical forming, it is almost impossible to naturally recover the lost elasticity. Therefore, as the elasticity of the food dough is very important in order to maintain the quality of a food product like bread, etc., the manual work of the skilled craftsman was always required in the process of forming food dough.

This applicant has provided conventional and various rolling apparatuses to solve the above problems, as, for example, a rolling apparatus comprising conveyers, arranged in a series, in which the speed of a downstream conveyer is faster than that of an upstream conveyer, and in which a plurality of rolling-rollers are arranged above the conveyers (see JP 44-6607 B, JP 60-52769 B, and JP 2917002 C).

Conventionally, when various kinds of bread dough are stretched or rolled into a thin belt from a thick belt, wrinkles or bubbles may be generated on the surface of the food dough belt according to the properties of the bread dough, the mechanical conditions, etc.

Also, abundant dusting powder had been necessary in order to prevent food dough from adhering to the spreading equipment for rolling a food dough belt.

SUMMARY OF THE INVENTION

To solve these problems, this invention uses such properties as those of the gel structure of bread dough. The gel structure of bread dough has properties easily fluidized by beats, impacts, vibrations, or the like. The fluidization of the bread dough is controlled by using such properties.

This invention relates to a prior treatment for well controlling the quality of bread (taste, flavor, etc.).

According to this invention, a plurality of rolling rollers move sequentially upstream from downstream or downstream from upstream along the food dough belt which is conveyed, while each rolling roller is rotating on its own axis, to beat and roll the food dough belt. Further, the moving speed and direction, and the rotating speed and direction, of the rolling rollers, are controlled selectively. The peripheral speed of the rolling roller is controlled to be equal or almost equal to the surface speed of the food dough belt on a conveying member. The number of beats is controlled by the moving speed of the rolling roller circulating along the food dough belt conveyed on the conveying member.

DETAILED DESCRIPTION OF THE PREFERRED EMBODIMENTS

Figure 1:
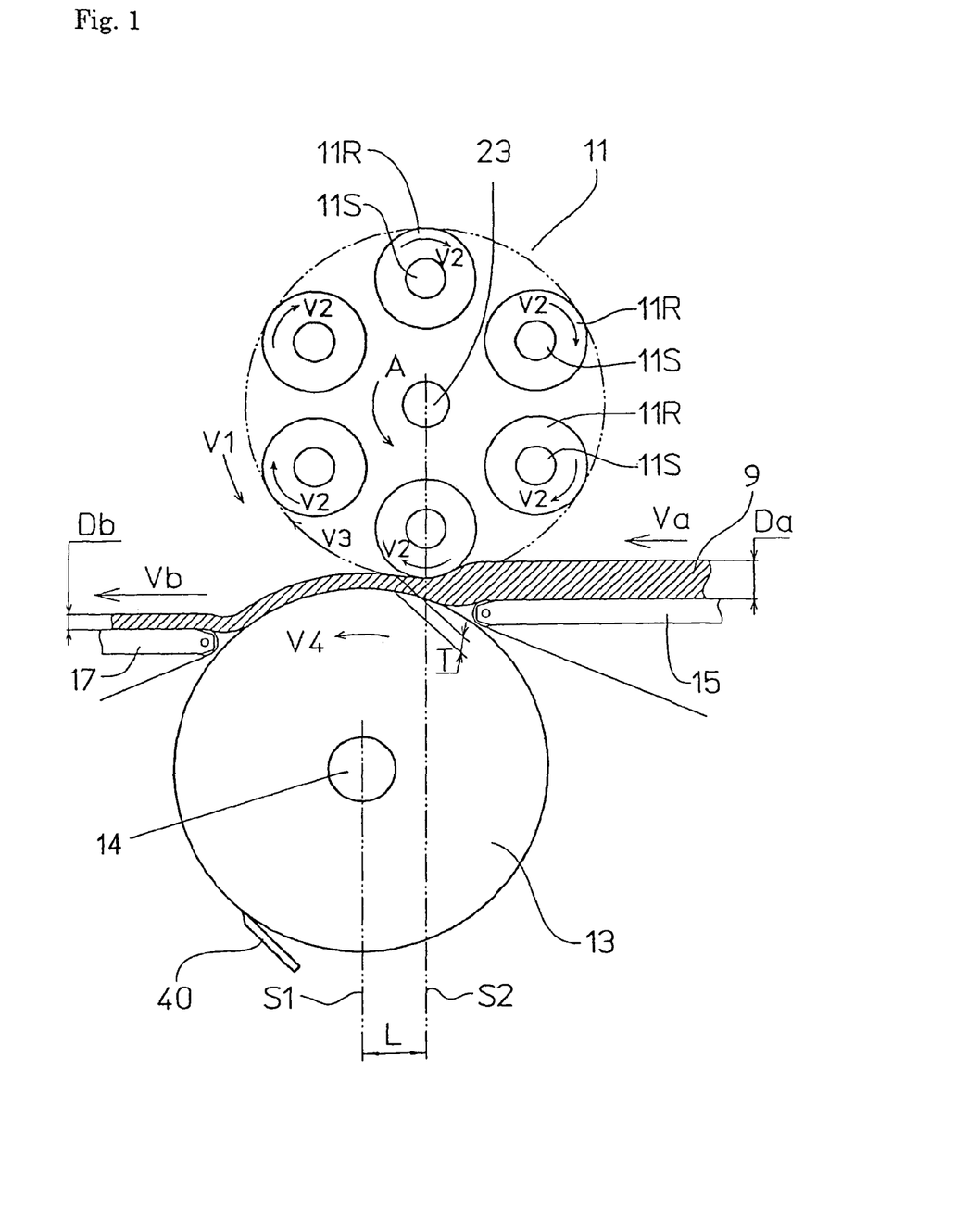
FIG. 1 shows a schematic elevational view of an embodiment of this invention.

FIG. 1 shows a schematic elevational view of an embodiment of this invention. A rolling apparatus 1 comprises a rolling member 11, such as a planetary roller mechanism, arranged with rolling rollers 11R, and a rolling member 13, facing the rolling member 11, such as a conveying and rolling roller with a large diameter. A gap T is arranged between the rolling roller 13 and the planetary roller mechanism 11 with the rolling rollers 11R. A dough belt 9 is supplied in the gap T via a supplying conveyer 15 and rolled to a predetermined thickness by the beating or striking rolling-rollers 11R and the conveying rolling-roller 13. A discharge conveyer 17 is arranged to be connected downstream of the conveying rolling-roller 13. The dough belt 9 is stretched to the thickness Db from the thickness Da.

The planetary roller mechanism 11 comprises a plurality of planetary rollers 11R moving in an endless orbit (for example, a circular orbit as shown in FIG. 1). The planetary rollers 11R are rotatable about their shafts 11S, each of which is secured at equal intervals on a circle of a wheel 11P.

The vertical surface S2 passing through the central axis 23 of the rolling member 11 is arranged upstream of the vertical surface S1 passing through the central axis 14 of the conveying roller 13.

Figure 2:
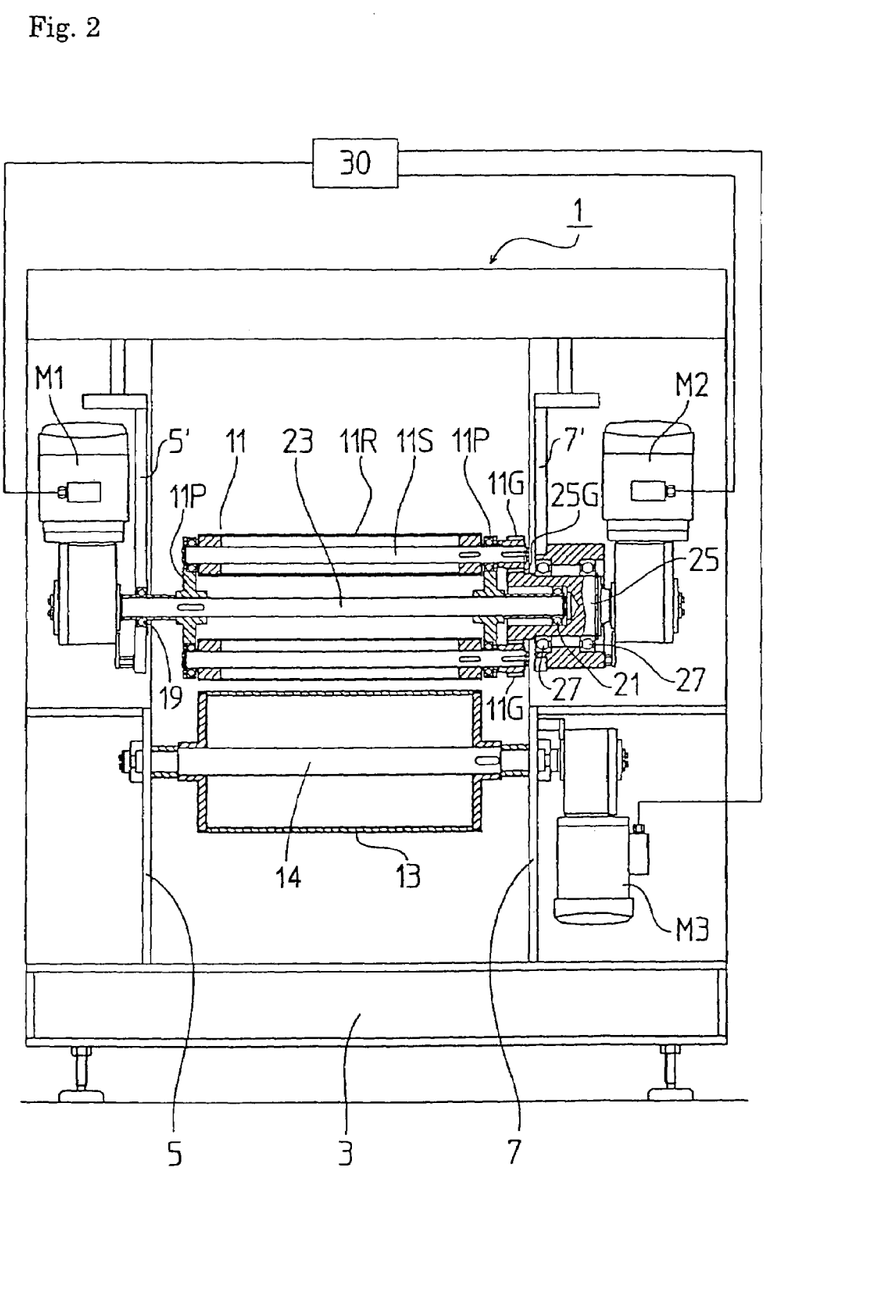
FIG. 2 shows a schematic front and partially cross-sectional view of the embodiment shown in FIG. 1.
Figure 3:
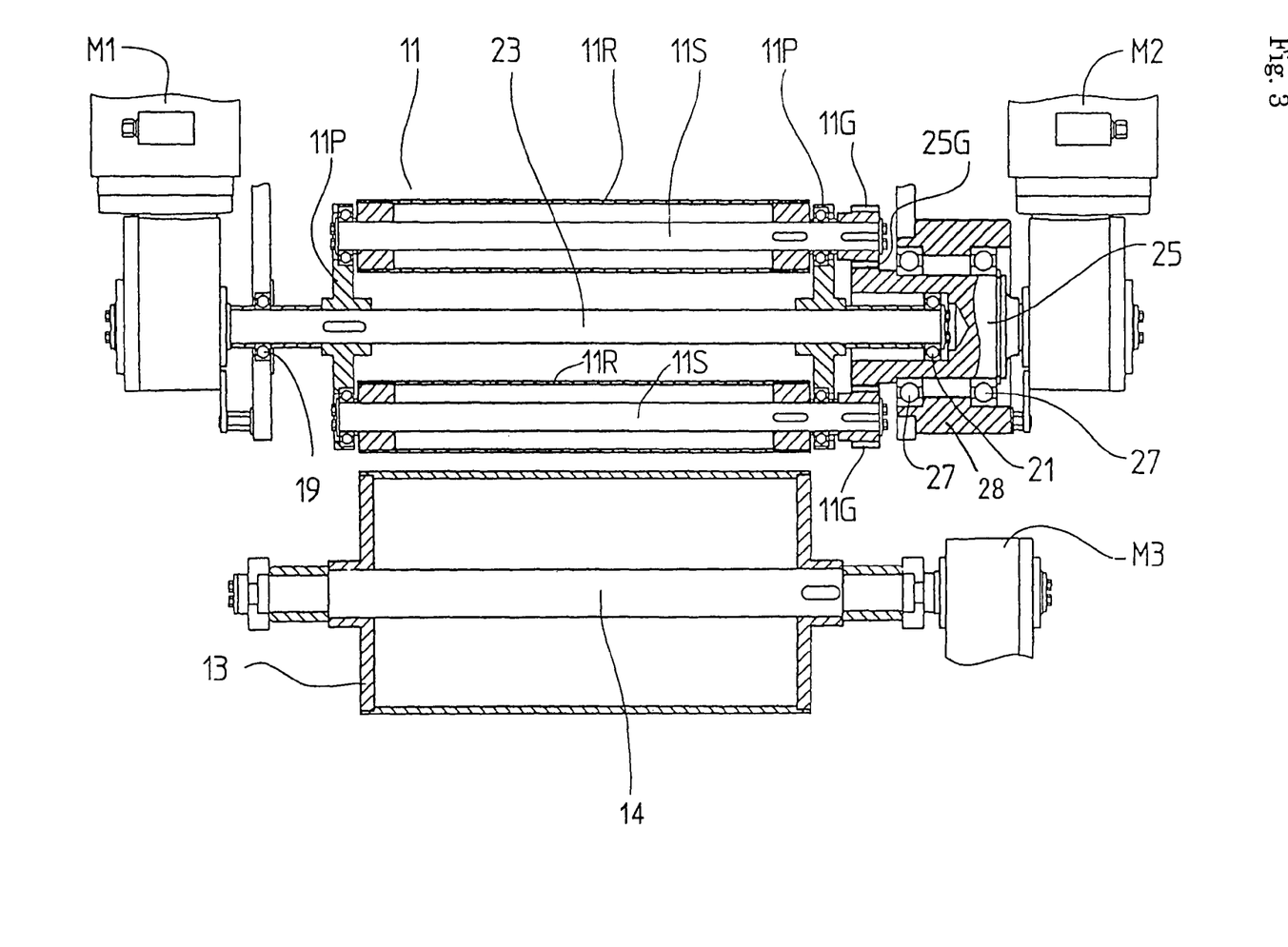
FIG. 3 shows a schematic side and partially cross-sectional view of the embodiment shown in FIG. 1.

FIG. 2 shows a schematic front view of the embodiment. FIG. 3 shows a schematic side view of the embodiment.

Figure 5:
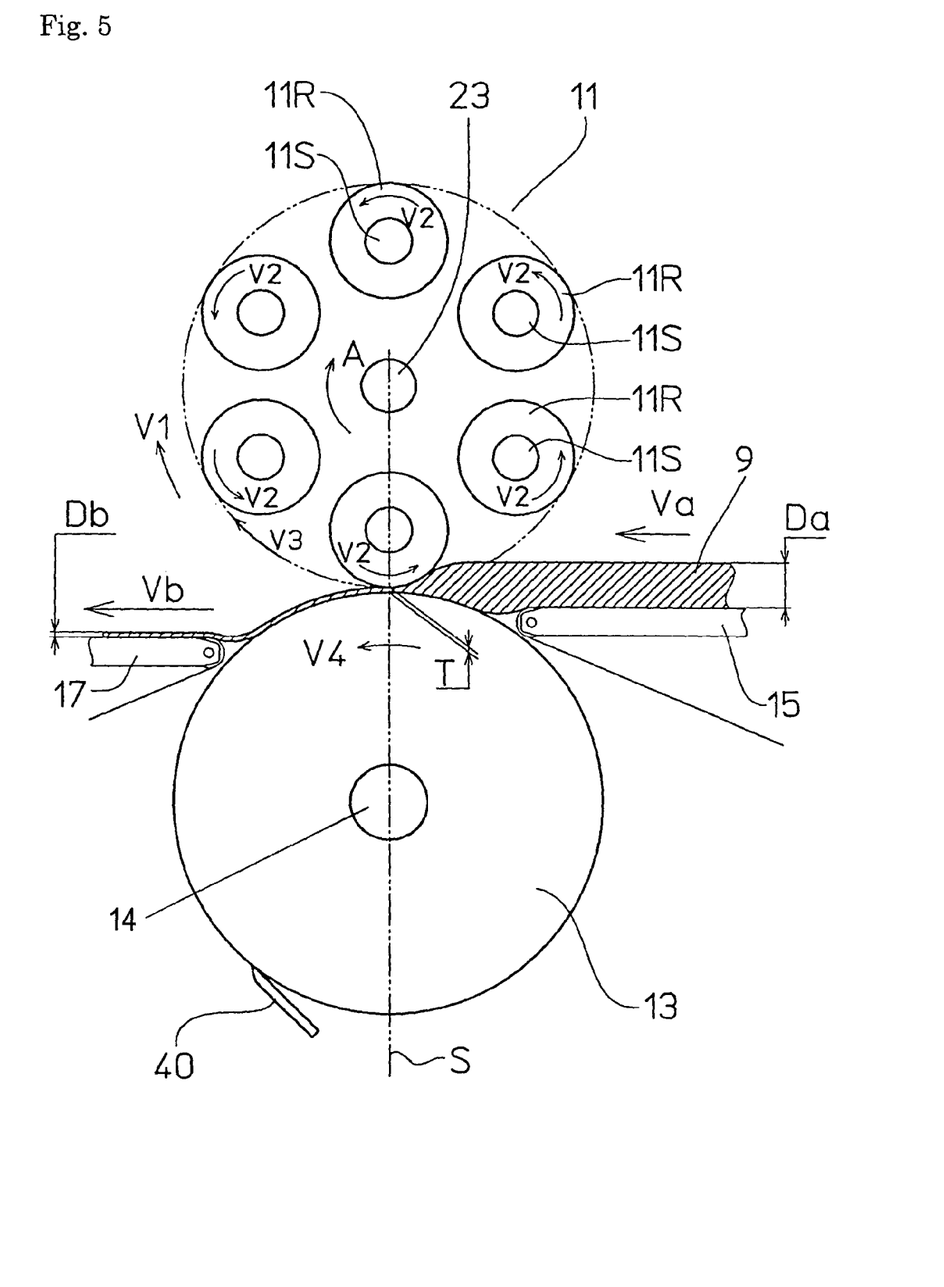
FIG. 5 shows a schematic elevational view of another embodiment of this invention.

FIG. 5 also shows a schematic elevational view of another embodiment of this invention, wherein the directions of the movement and the rotation of the rolling rollers differ from those of the embodiment shown in FIG. 1. The schematic side view of the embodiment shown in FIG. 5 is same as that of the embodiment shown in FIG. 1.

Lower side frames 5, 7 are arranged respectively on the right and left sides of a base 3. Upper side frames 5', 7' are arranged respectively above said side frames 5, 7. A first conveyer 15, a large diameter roller 13, disposed downstream, for conveying and rolling a food dough belt 9, as, for example, a bread dough belt, and a second conveyer 17, disposed further downstream, are arranged in this order between these side frames 5, 7, 5', 7'. A roller mechanism 11 is arranged facing the large diameter roller 13. A conveying path of the food dough belt 9 is set up between the roller mechanism 11 and the large diameter roller 13.

The longitudinal position of the roller mechanism 11 can be changed by a lifting device (not shown). Therefore, the gap T between the roller mechanism 11 and the large-diameter roller 13 can be controlled.

The conveying path of the food dough belt 9 may be arranged not only horizontally on the first conveyer 15, on the conveying roller 13, and on the second conveyer 17, as illustrated above, but also vertically. In the latter case, the food dough belt 9 is conveyed vertically, and the roller mechanism 11 and the conveying roller, facing each other, may be arranged horizontally.

The roller mechanism 11 is installed on a rotating shaft 23 supported rotatably via bearings 19, 21 and bearings 27 by the side frames 5', 7'. The rotating shaft 23 is coupled to a motor M1 such as a servo-motor (a first rotating means).

The roller mechanism 11 comprises a plurality of rolling rollers 11R rotatably supported at their ends by a pair of supporting plates 11P, fixed apart from each other on the shaft 23. The rolling rollers 11R are provided as an example of means for sequentially beating and rolling the food dough 9. A plurality of planet rollers 11R are arranged respectively at equal intervals on the same circle, the center of which is the axis of the rotating shaft 23. In other words, the planetary rollers revolve in an endless orbit by means of the rotation of the rotating shaft 23.

When the motor M1 rotates the rotating shaft 23 in the direction A, a plurality of the planetary rollers 11R revolve in a direction V1 that is opposite to a transporting direction Va of the dough belt 9, and, sequentially, beat the dough belt 9 in the direction V1 and roll the dough belt 9 in the direction V2 along the transporting direction Va, Vb.

The planetary roller 11R is fixed on the supporting shaft 11S. A planetary gear 11G is fixed at the end of the supporting shaft 11S. The planetary gear 11G engages with a gear 25G arranged in the periphery of a rotating shaft 25. In a central concavity of the rotating shaft 25, a bearing 21 is installed. The periphery of the rotating shaft 25 is supported via bearings 27 in a frame member 28, which is fixed to the frame 7'. The rotating shaft 25 is coupled to a motor M2, such as a servo-motor.

Therefore, when the motor M2 rotates the rotating shaft 25, the rotating shaft 25 rotates the planetary gear 11G, and then the planetary roller 11R rotates on its own axis. The rotating direction of the planetary roller 11R is changed in accordance with the rotating direction of the motor M2.

The revolving direction A and speed V1 of the planetary roller 11R circulating on the axis of the rotating shaft 23 is changed by the motor M1. Also, the rotating direction and speed V2 of the planetary roller 11R rotating on its own axis is changed by the motors M1 and M2.

For example, if the motor M2 is stopped and the motor M1 only rotates clockwise (or anticlockwise), to give a simple explanation, the planetary gear 11G engaged with the gear 25G revolves clockwise (or anticlockwise) on the gear 25G while rotating clockwise on its own axis, so that the planetary roller 11R rotates clockwise (or anticlockwise) on its own axis while revolving clockwise.

Next, the motor M2, and therefore the gear 25G, begin to rotate clockwise (or anticlockwise). As their rotating frequency increases gradually and becomes the same as the revolving frequency of the planetary roller 11R, the planetary roller 11R stops its rotation and continues only its revolution.

Therefore, the resultant speed V3 of the peripheral surface of the planetary roller 11R is composed of the revolving speed V1 and the rotating speed V2 of the planetary roller 11R.

The revolving direction or the moving direction of the planetary roller 11R depends on the rotating direction of the motor M2. Whether the planetary roller 11R moves downstream from upstream, or upstream from downstream, in terms of a dough belt being conveyed, is determined by the rotating direction of the motor M1. The rotating direction and the rotating speed V2 of the planetary roller 11R depend on the rotating speeds of the motors M1, M2.

The rotating speed V3 of the peripheral surface of the planetary roller 11R is the sum of the revolving speed V1 and the rotating speed V2 of the planetary roller 11R. The speed V4 of the peripheral surface of the conveying roller 13 is controlled to be equal to or almost equal to the speed V3.

Figure 6:
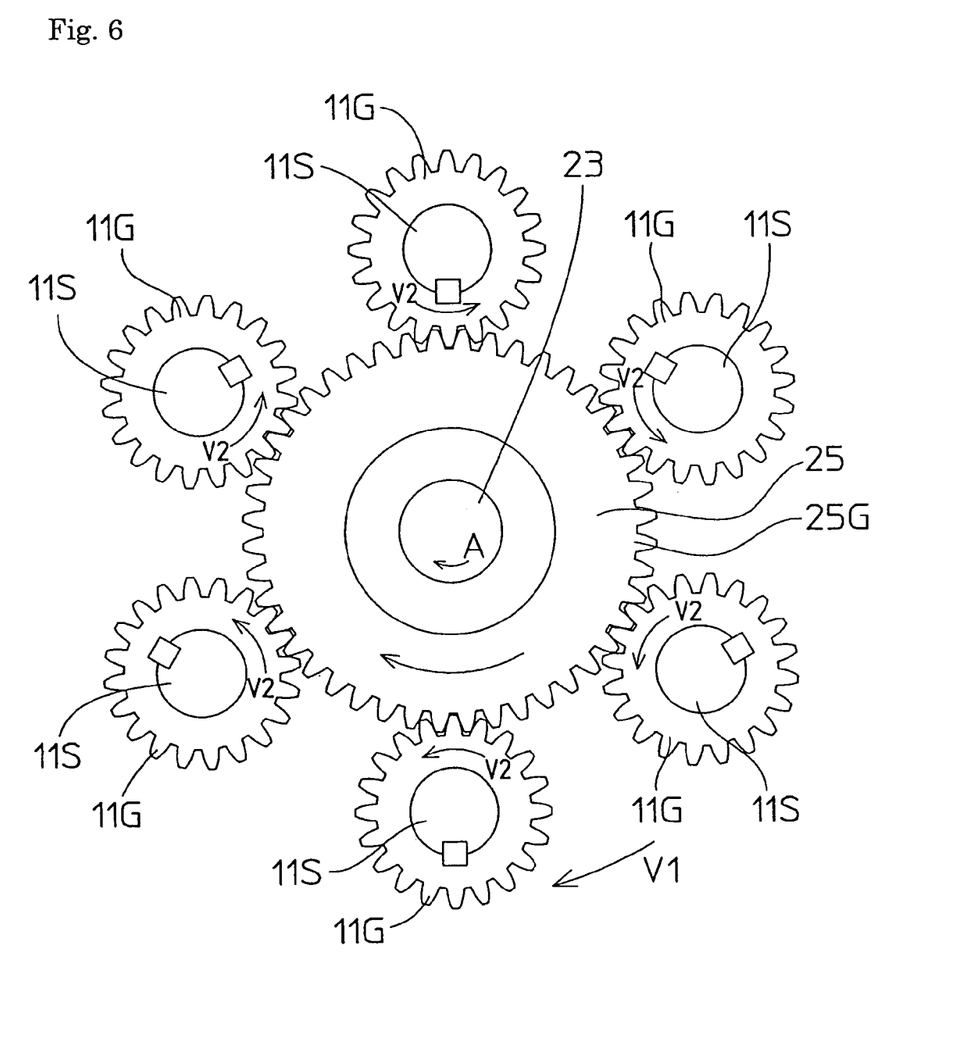
FIG. 6 shows a schematic view of the planetary gear mechanism of the embodiment shown in FIG. 5.

FIGS. 5 and 6 illustrate the embodiment wherein a plurality of rolling rollers circulate and move sequentially downstream from upstream along the food dough belt being conveyed, while each roller is rotating anticlockwise on its own axis. By a motor M1, the rolling rollers circulate and move sequentially downstream from upstream at a speed V1 in the direction A. In this case, when the gears 25G rotate clockwise, their rotation makes the rolling rollers 11R rotate anticlockwise on their own axes at a speed V2, as shown in FIG. 6. Then, the speed V1 and the speed V2 cancel each other out. Likewise, the speeds V1 and V2 are controlled by the control of the rotation of the motors M1 and M2. Accordingly, the speeds V3 and V4 can be made to almost equal each other.

$$V1+(-V2)=V3 \approx V4.$$

In FIG. 6, the planetary roller 11R in a lower part of its revolution moves or revolves upstream relative to a conveying direction of the dough belt. The revolving speed of the planetary roller 11R is V1. The rotating speed of the planetary roller 11R is V2. The resultant speed of the planetary roller 11R is V3. The rotating speed of the conveying and rolling roller 13 is V4. The revolving direction of the planetary roller 11R is A An antidockwise rotation of the gear 25 gives the planetary roller 11R a clockwise rotation (referring to V2). V3 is controlled by V1 and V2, as follows:

$$V2-V1=V3. \quad V3=V4, \quad V3 \approx V4, \quad \text{or} \quad V3/V4=C \text{ (constant)}.$$

The conveying roller 13 is rotated at the same speed as that of the second conveyer 17 by the motor M3, such as a servo-motor, to cooperate with said roller mechanism 11 and beat food dough 9. Code 30 denotes a control device to control the motors M1, M2, and M3.

A control apparatus 30 controls the moving speed V1 and direction, and the rotating speed V2 and direction of the rolling roller 11R.

The peripheral speed V3 of the rolling-roller in 11R can be made to equal or almost equal the surface speed of the food dough belt by the control apparatus 30.

When the rolling rollers move sequentially downstream from upstream along the food dough belt, the food dough belt is easily caught at its leading end between the first and second rolling members.

The control device 30 controls the motors M1, M2, and M3 based on the calculated speeds of the rotation and revolution (or movement) of the planetary rollers 11R to vary the number of beats and the level of the beats of the planetary rollers 11R beating the food dough belt 9.

The beating direction of the planetary rollers 11R depend on the direction of the revolution or movement of the planetary rollers 11R.

The quality, quantity and direction, etc., of beating against food dough are changed or decided experimentally based on the properties of the food dough, as, for example, the fermentation conditions of the dough, the achievement of the fermentation, the localization of bubbles in the dough, the hardness and thickness of the dough, etc.

Though such beating actions or functions are illustrated in the planetary roller mechanism as mentioned above, this invention should not be restricted to the planetary roller or gear mechanism.

A stretching or rolling roller 13 has a large diameter and a scraper 40 for removing deposits on the surface of the large diameter roller 13. Therefore, the food dough being conveyed always contacts the cleaned surface of the large diameter roller 13 and is prevented from adhering to it. As the roller 13 has a large diameter, its surface is easily scraped.

It is possible to increase the contacting surface of the thinly rolled or stretched dough belt on the conveying roller 13 by shifting a vertical surface S2 passing through the central axis of the planetary roller mechanism 11 from a vertical surface S1 of the conveying roller 13 toward the upstream direction of the food dough 9 being conveyed, as shown in FIG. 6. In another case, even if these two surfaces are in the same position, the contacting surface can be increased by installing the second conveyer 17 in a lower position of the conveying roller 13 (see FIG. 1).

There is an interval L between the first and second planes S1, S2, which planes are perpendicular to the direction for transporting food dough, as shown in FIG. 6. Code Da denotes a thickness of a food dough band 9 which is being fed to this apparatus. Code T shows a gap formed by the planetary roller mechanism 11 and the conveying roller 13.

According to such arrangement, the slippage between the thinly stretched food-dough belt 9 and the surface of the conveying roller 13 is reduced by the larger contact-surface therebetween on the conveying roller 13 with a large diameter, even if the conveying speed of the conveying roller 13 is faster than that of the first conveyer 15. Consequently, a stretching or rolling effect is caused.

The roller mechanism 11, which is arranged upstream of the conveying roller 13, as shown in FIG. 1, can prevent the food dough belt 9 from being rapidly drawn by the conveying roller 13. Therefore, a smooth beating and stretching action will be carried out.

Further, by adjusting the speed difference between the first conveyor 15 and the conveying roller 13, and the position of the roller mechanism 11 arranged upstream of the conveying roller 13, the optimum beating action can be chosen.

Figure 7:
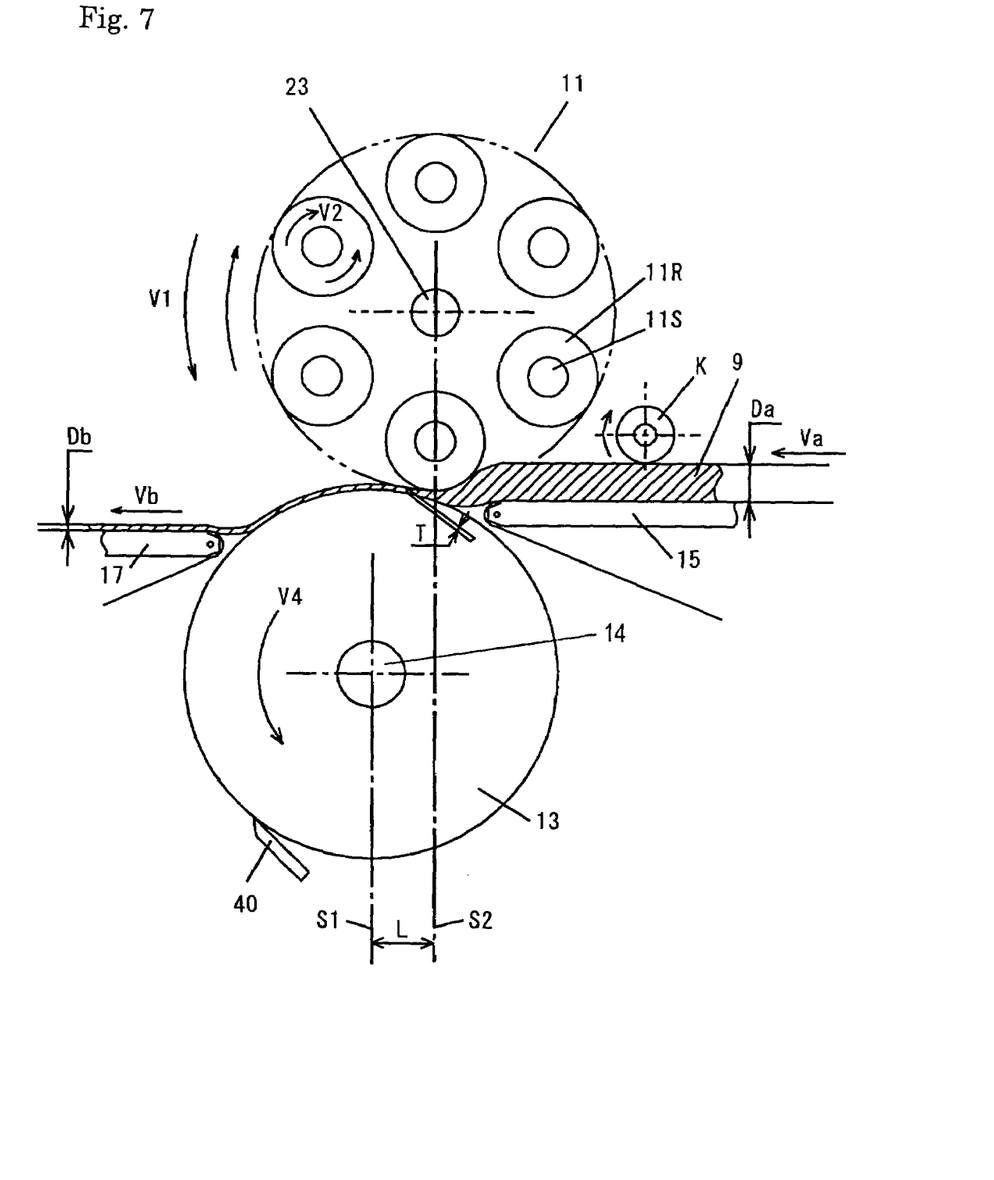
FIG. 7 shows a schematic elevational view of the other embodiment of this invention.

Also, as shown in FIG. 7, a pressing roller K, as, for example, one rotating freely at a set position, is arranged upstream of the roller mechanism 11, to regulate the thickness Da of the food dough belt, so that the food dough belt 9 will not be abruptly drawn or caught between the rolling members.

Means for shifting the roller mechanism 11 upstream of the conveying roller 13 is shown in JP-S63-54333-B (JP-S61-100144-A), by this applicant. The side frames 5', 7' can be arranged to be shifted relative to the conveying roller 13 on a conveying path of the dough belt 9, as shown in JP-S63-54333-B (JP-S61-100144-A).

Figure 10:
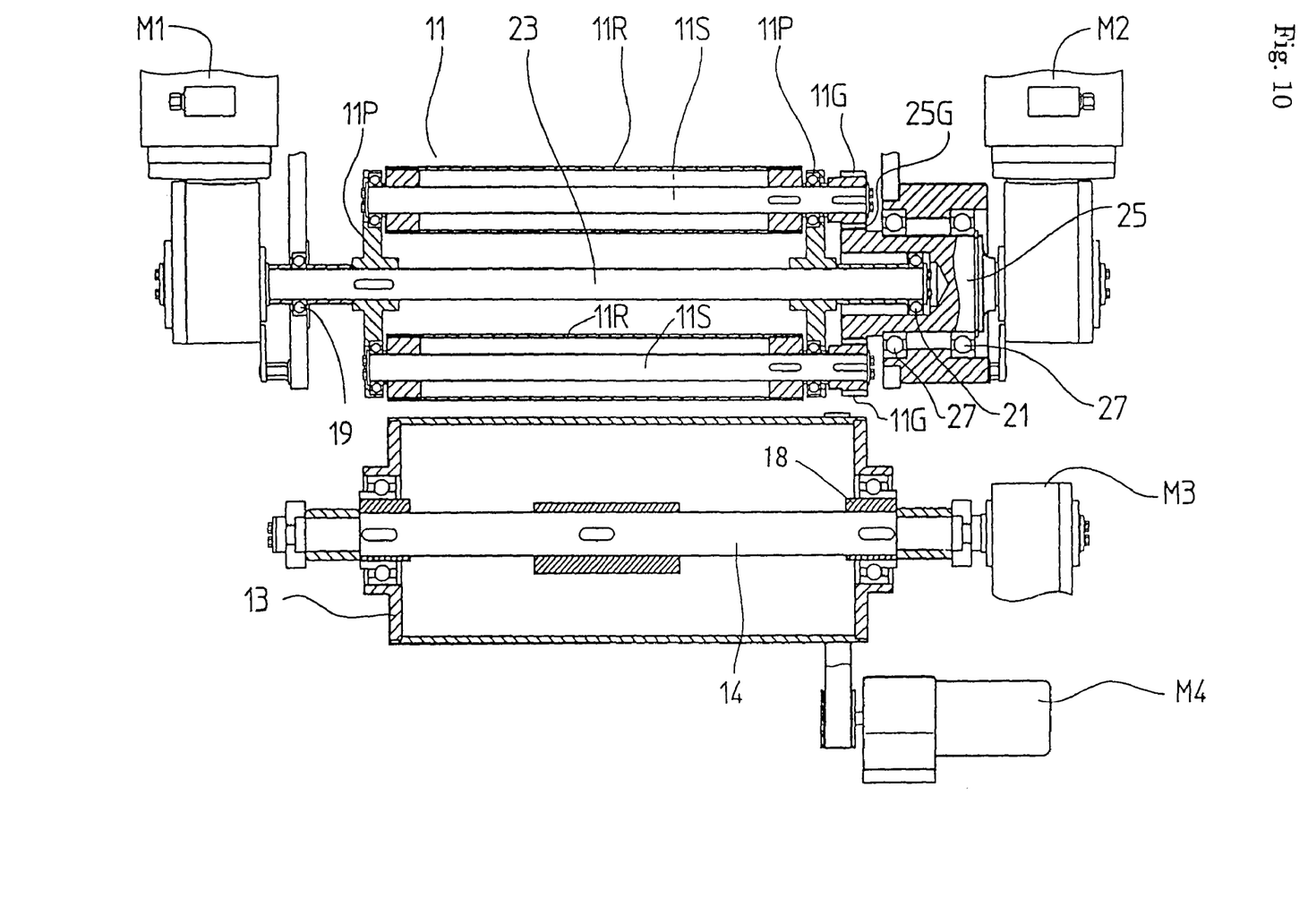
FIG. 10 shows a schematic front and partially cross-sectional view of the other embodiment of this invention.

Also, to further promote a faster beating effect for food dough, the conveying roller 13 can be arranged to vibrate toward the roller mechanism 11, as shown in JP-2003-61561, by this applicant. The conveying roller 13 is rotatably supported on an eccentric member 14' fixed to a rotating shaft 14, as shown in FIG. 10. The conveying roller 13 is rotated by the motor M4 and vibrated by the eccentric member 14'.

The control method or steps for the embodiments of this invention is described as follows:

First, the data on the properties, the thickness Da, and the feeding speed Va of the dough belt 9 carried in by the first conveyer 15 are input into the control device 30. Next, the thickness Db and the conveying speed Vb of the dough belt 9 carried out by the second conveyer 17 are input into the control device 30.

The difference between the thickness T or Da and the thickness Db affects the difference between the feeding speed Va of the first conveyer 15 and the rotating speed V4 of the conveying roller 13.

In accordance with these operations, a gap T between the roller mechanism 11 and the conveying roller 13, the revolving speed V1, the rotating speed V2, the conveying speed V4, and the resultant speed V3, etc., are set. For example, considering the spring-back nature of bread dough, etc., the gap T should be set to be somewhat small. Further, these set values should be adjusted experimentally based on the food dough actually adopted, if necessary.

As mentioned above, the control apparatus 30 controls the motors M1, M2 and M3 to regulate the peripheral speed V3 of the rolling roller 11R to be equal to or almost equal to the surface speed V4 of the conveying roller 13, if necessary.

The number of beats against food dough depends on the revolving or moving speed and the number of planetary rollers 11R, and the conveying speed of the food dough. It would be adjusted in accordance with the nature of the food dough material, such as the elasticity, hardness, softness, thickness, etc.

According to this invention, the number of beats against the dough belt 9 can be changed by the revolving speed V1 being kept at V3/V4=C (constant), as described above. Therefore, various types of bread dough can be pretreated favorably.

The fermentation of bread dough begins after the mixing. According to the progress of the fermentation, the strength of the gluten structure in bread dough is different. The homogenization of food dough such as bread dough can be accomplished by beating and moving actions according to the prior treatment of this invention.

When multi-layered dough like pie dough is rolled, the transferring speed of the surface layer of the dough is regulated so as not to be faster than the inner layer, by means of the peripheral speed of the planetary roller 11R being slower than that of the conveying roller 13 (V3<V4).

In other words, by V3 and V4 being similar, when the food dough 9 is rolled momentarily between the planetary roller 11R and conveying roller 13, no slippage accompanied with the adhesion of dough occurs, so that it becomes unnecessary to scatter more dusting powder than necessary.

Also, the peripheral speed V3 of the rolling roller 11R can be regulated so that it can be equal to or almost equal to the peripheral speed V4 of the conveying roller 13.

Further, even if the moving or circulating speed V1 is changed, the peripheral speed V3 of the rolling roller 11R and the peripheral speed V4 can be controlled to be equal or unequal.

Figure 4:
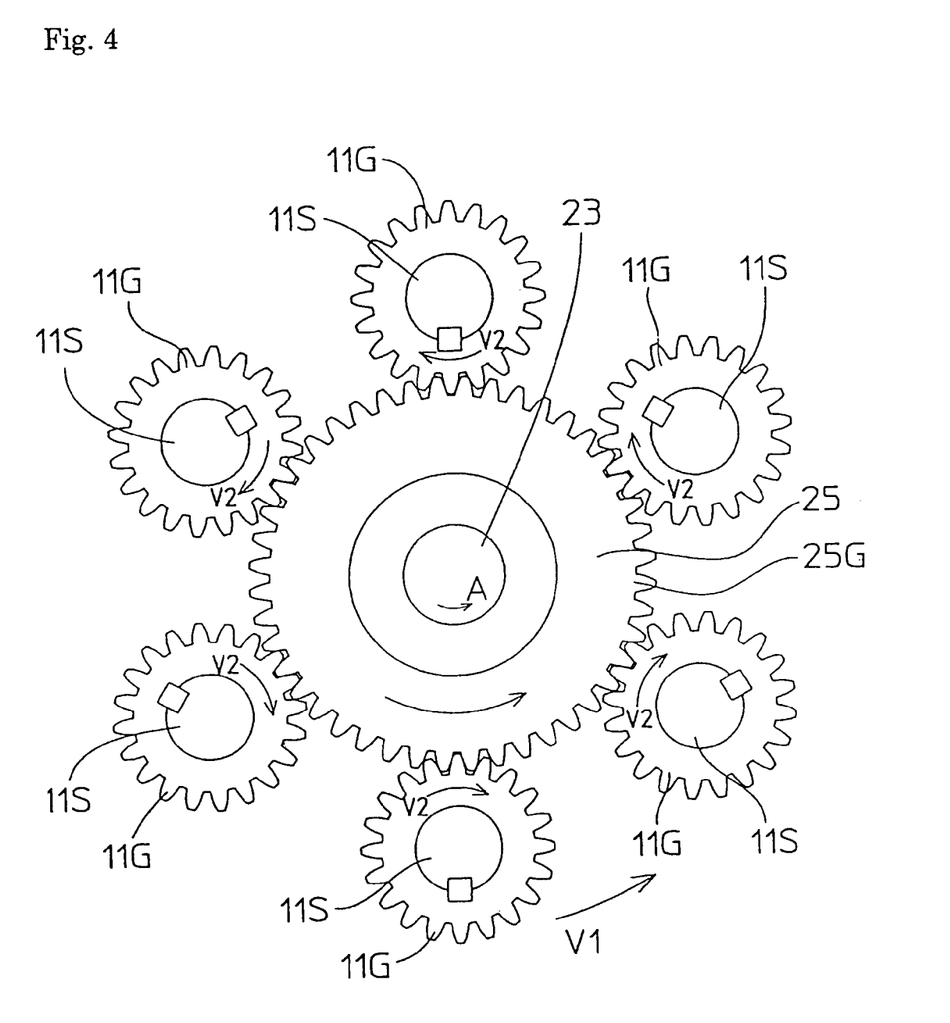
FIG. 4 shows a schematic view of the planetary gear mechanism of the embodiment shown in FIG. 1.

A ring-shaped external gear, which replaces an internal gear 25G (shown in FIGS. 4 and 6), may be arranged to be engaged outside of planetary gears 11R.

Figure 8:
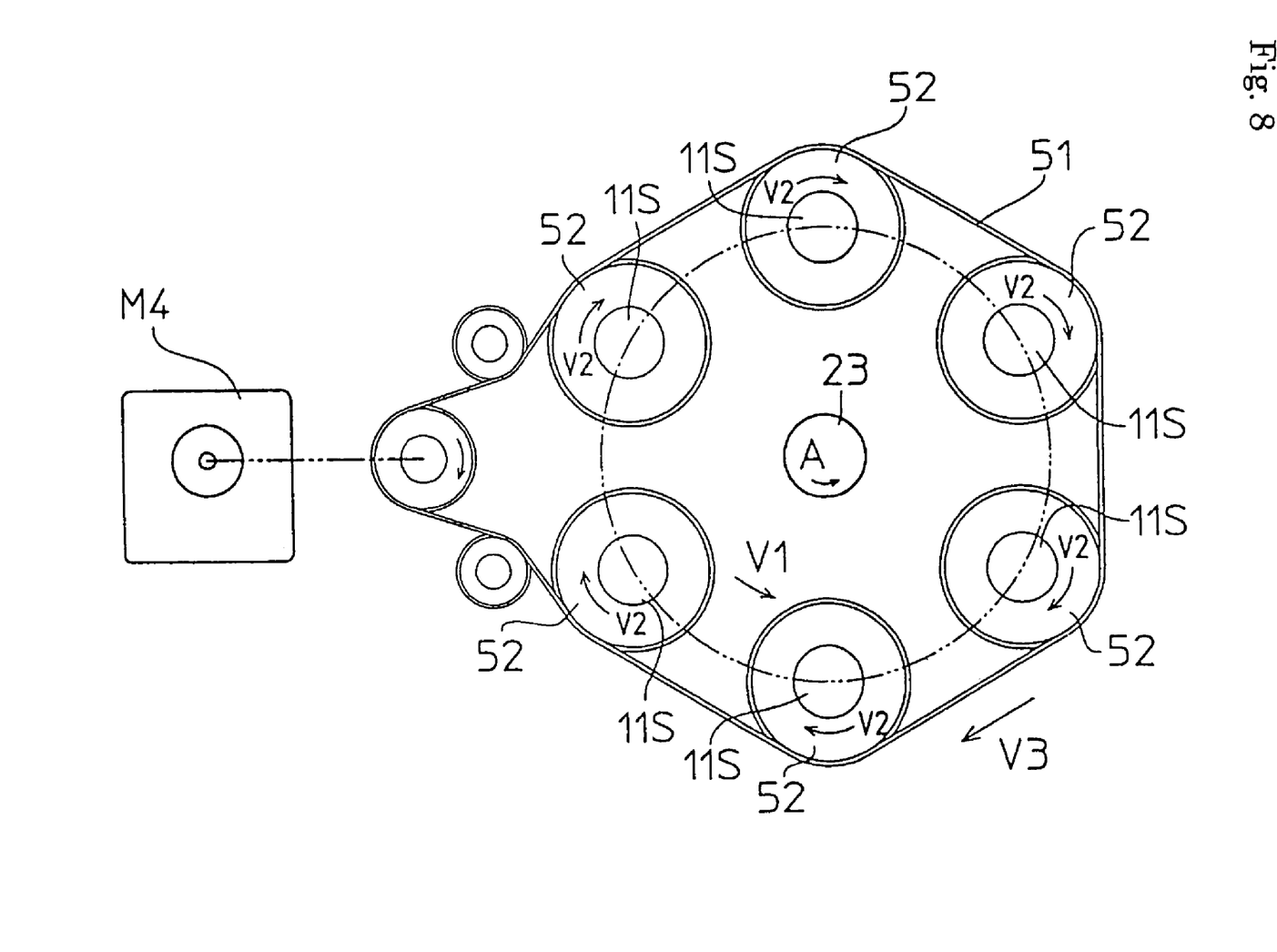
FIG. 8 shows a schematic front and partially cross-sectional view of the other embodiment of this invention.

FIG. 8 shows a schematic elevational view of another embodiment of this invention. A timing belt 51 and a plurality of timing pulleys 52, which replace the internal gear 25G and a plurality of the planetary gears 11G (shown in FIGS. 4 and 6), may be arranged to rotate the timing pulleys 52 and then the planetary rollers 11R.

Figure 9:
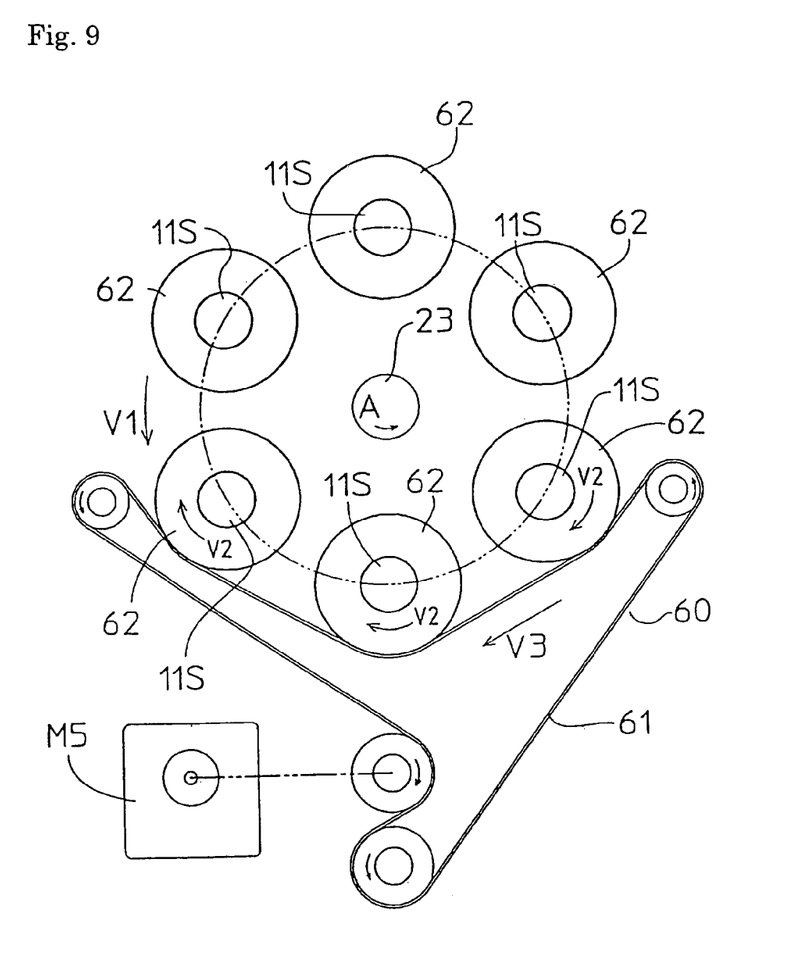
FIG. 9 shows a schematic view of the planetary roller mechanism of the other embodiment of this invention.

FIG. 9 shows a schematic elevational view., of another embodiment of this invention. In the lower part of the roller mechanism 11, a driving belt mechanism 60, to revolve planetary rollers 11R, is arranged. A driving belt 61 is circulated by a motor M5, such as a servo-motor, and rotates a plurality of pulleys 62 fixed to the planetary rollers 11R that are in frictional contact only when the pulleys 62 revolve in a lower part of the planetary roller mechanism 11. Then, the planetary rollers 11R are rotated and revolved by the pulleys 62.

According to this invention, it is possible to release the surplus gas within bread dough and make the internal phase of bread dough uniform without harming the dough structure.

In spite of various kinds of bread dough and environmental conditions, it is possible to manufacture high-quality breads.

It is possible to release surplus gas within bread dough, surpress bubbles scattered in the surface layer of bread dough, and make the surface clean.

Though it was necessary to conventionally use a large quantity of dusting powder to prevent food dough from adhering to a rolling apparatus, it is possible to greatly decrease the quantity.

Also, though the elasticity of bread dough has been lost conventionally in the mechanical forming process, and, therefore, a complicated apparatus such as an overhead proofer has been needed to recover the elasticity, these problems can be solved according to this invention.

What is claimed is:

1. An apparatus for beating and rolling a food dough belt conveyed between rolling members, comprising:
    a first rolling member having a plurality of rolling rollers which move in an endless orbit and which can move sequentially upstream from downstream and downstream from upstream along the food dough belt, while each rolling roller is rotating about the axis of the rolling roller,
    a second rolling member conveying the food dough belt thereon, and
    a control apparatus for controlling the speed of the movement and the speed of the rotation of the rolling rollers,
    wherein when the first rolling member moves sequentially upstream from downstream, the respective rolling rollers are controlled so as to be rotated in the reverse direction of the rotation of the second rolling member, and
    wherein when the first roller member moves sequentially downstream from upstream, the respective rolling rollers are controlled so as to be rotated in the same direction as the rotation of the second rolling member, and
    wherein the speed of the rotation of the rolling rollers can be controlled independently from the speed of the movement of the rolling rollers.

2. An apparatus according to claim 1, wherein the peripheral speed V3 of the rolling rollers is made to be equal to or almost equal to the surface speed of the food dough belt by the control apparatus.

3. An apparatus according to claim 1, wherein the first rolling member comprises a planetary roller mechanism or a planetary gear mechanism.

4. An apparatus according to any of claim 1, wherein the second rolling member comprises a conveying roller with a large diameter than that of the rolling rollers.

5. An apparatus according to any of claim 1, wherein the second rolling member includes a conveying roller and a supplying conveyer, and therebetween a space is arranged for releasing gas from the lower part of the food dough belt.

6. An apparatus according to any of claim 1, wherein the vertical surface passing through the central axis of the first rolling member is arranged upstream of the vertical surface that passes through the central axis of the second rolling member.

7. A method for beating and rolling a food dough belt which is conveyed in accordance with a plurality of rolling rollers which move in an endless orbit and which can move sequentially upstream from downstream and downstream from upstream along the food dough belt, while each rolling roller rotates about the axis of the rolling roller,
    characterized by controlling the number of beats by controlling the speed of the movement and the speed of the rotation of the rolling rollers,
    wherein when the first rolling member moves sequentially upstream from downstream, the respective rolling rollers are controlled so as to be rotated in the reverse direction of the rotation of a second rolling member for conveying the food dough belt thereon, and
    wherein when the first rolling member moves sequentially downstream from upstream, the respective rolling rollers are controlled so as to be rotated in the same direction as the rotation of the second rolling member, and
    wherein the speed of the rotation of the rolling rollers can be controlled independently from the speed of the movement of the rolling rollers.

* * * * *